No. 869,343. PATENTED OCT. 29, 1907.
C. A. BAKER & T. L. SMITH.
WHEELBARROW WHEEL.
APPLICATION FILED SEPT. 10, 1906.

Witnesses.
Anna F. Schmidtbauer
Anna A. Klug

Inventors.
Charles A. Baker, &
Thomas L. Smith.
By Benedict, Morsell & Caldwell.
Attorneys.

UNITED STATES PATENT OFFICE.

CHARLES A. BAKER AND THOMAS L. SMITH, OF MILWAUKEE, WISCONSIN, ASSIGNORS TO STERLING WHEELBARROW COMPANY, OF MILWAUKEE, WISCONSIN, A CORPORATION OF WISCONSIN.

WHEELBARROW-WHEEL.

No. 869,343.  Specification of Letters Patent.  Patented Oct. 29, 1907.

Application filed September 10, 1906. Serial No. 333,901.

*To all whom it may concern:*

Be it known that we, CHARLES A. BAKER and THOMAS L. SMITH, residing in Milwaukee, county of Milwaukee, and State of Wisconsin, have invented new and useful Improvements in Wheelbarrow-Wheels, of which the following is a description, reference being had to the accompanying drawings, which are a part of this specification.

This invention has for its object to improve upon the construction of wheelbarrow wheels to render them easy-running without complication and to produce a roller bearing wheelbarrow wheel of minimum cost.

Another object of this invention is to provide a bracket construction for mounting a wheelbarrow wheel on the wheelbarrow which will permit of variation in its positioning without binding.

With the above and other objects in view the invention consists in the wheelbarrow wheel herein claimed, its parts and combinations of parts and all equivalents.

Figure 1:
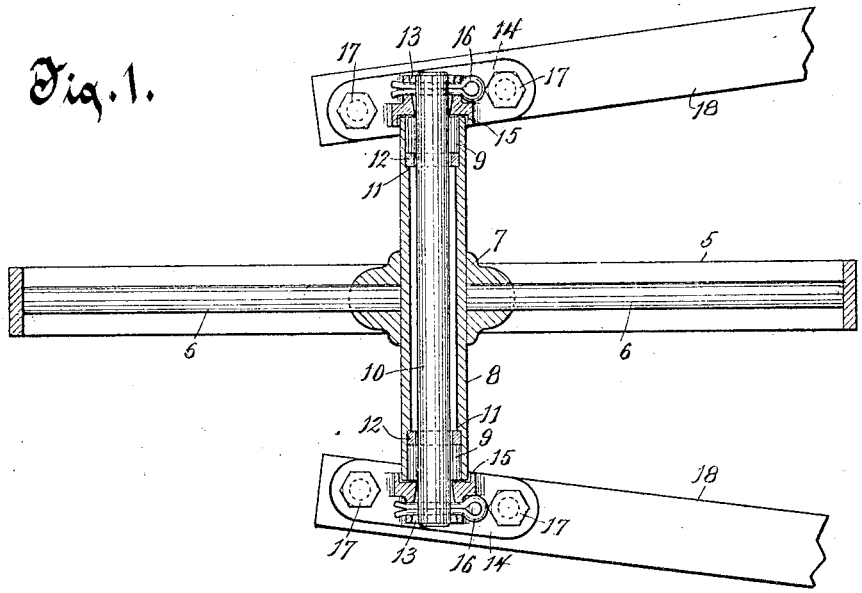
Figure 2:
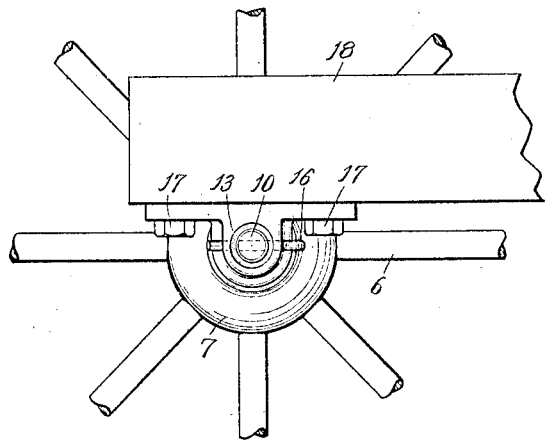
Figure 3:
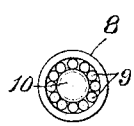

Referring to the accompanying drawings in which like characters of reference indicate like parts in the several views: Figure 1 is an inverted plan view of the wheelbarrow wheel constructed in accordance with this invention; Fig. 2 is an end elevation thereof; and, Fig. 3 is an end elevation of one end of the wheel spindle with the bracket removed and showing the roller bearing.

In these drawings 5 represents a circular rim which is connected by radial spokes 6 to a cast hub 7 on a tubular sleeve 8, the construction of the rim, spokes and hub being immaterial to this invention. The tubular sleeve 8 is made of heavy metal tubing countersunk at its ends to produce perfectly true race-ways for series of rollers 9 which are located therein between the ends of the tubular sleeve and a pin 10 which extends entirely through the sleeve. The countersunk portions at the ends of the tubular sleeve produce shoulders 11 against which fit rings or washers 12 to form end abutments for the series of rollers 9, the rings being of smaller internal diameter than the sleeve to produce a greater abutment for the rollers than would be produced by the shoulders alone. The rings are easily removable to be replaced when worn.

The ends of the pin 10 which project from the roller bearings enter tapering openings 13 in connecting brackets 14, the smaller ends of the openings being next to the roller bearings, and the connecting brackets being countersunk to form cup-shaped sockets or recesses 15 to receive the ends of the sleeve 8. The parts of the connecting brackets 14 fit loosely on the ends of the sleeve and on the pin 10 without allowing a great amount of play for the pin, but permitting variation in the positioning of the connecting brackets by reason of the tapering openings 13 without binding. The inside faces of the sockets 15 form abutments for the series of rollers 9 and serve in conjunction with the rings 12 to keep the rollers in their proper position, while the cup-shaped formation of the sockets prevents dirt entering the roller bearings. Cotter pins 16 are passed through the internally tapering tubular parts of the connecting brackets and through the ends of the pin 10 to hold the connecting brackets in position on the pin and in proper relation to the wheel. The connecting brackets 14 are clamped by bolts 17 to the front ends of the handles 18 of a wheelbarrow as usual.

The main feature of advantage of this invention is the simplicity of construction which renders the device inexpensive to manufacture and produces a durable and efficient easy-running wheel. The formation of the race-ways by countersinking the ends of a tubular spindle and fitting rings against the internal shoulders thus produced permits of the tubular spindle being formed of light material and still possessing the necessary end abutment for the series of rollers. The tapering opening in the connecting bracket prevents binding with the pin as the result of inaccuracy in workmanship in constructing the wheel with its bearings or in mounting the wheel on a wheelbarrow, this being accomplished without allowing a great amount of play between the pin and the connecting brackets.

What we claim as new and desire to secure by Letters Patent is:

1. A wheelbarrow wheel having a tubular spindle with its bore countersunk at its ends forming internal shoulders, rings fitting in the countersunk bores of the tubular spindle against the internal shoulders thereof, series of rollers located in the countersunk bores and held in place by the rings, a pin passing through the tubular spindle and bearing on the rollers, and connecting brackets mounted on the ends of the pin and holding the rollers in place.

2. A wheelbarrow wheel having a tubular spindle with its bore countersunk at its ends forming internal shoulders, rings fitting in the countersunk bores of the tubular spindle against the internal shoulders thereof, series of rollers located in the countersunk bores and held in place by the rings, a pin passing through the tubular spindle and bearing on the rollers, and connecting brackets secured to the pin and having cup-shaped sockets to receive and protect the ends of the tubular spindle and hold the rollers in place.

3. A wheelbarrow wheel having a tubular spindle, a pin passing through the tubular spindle, roller bearings between the pin and the tubular spindle, connecting brackets having openings through which the pin loosely passes, and means for connecting the pin with the connecting brackets in a manner to permit of movement of the pin in said openings.

4. A wheelbarrow wheel having a tubular spindle, a pin passing through the tubular spindle, roller bearings between the pin and the tubular spindle, connecting brackets having tapering openings through which the pin passes, and means for connecting the pin with the connecting brackets.

5. A wheelbarrow wheel having a tubular spindle, a pin passing through the tubular spindle, roller bearings between the pin and the tubular spindle at the ends of the tubular spindle, connecting brackets having tapering openings through which the ends of the pin pass, said connecting brackets serving to hold the roller bearings in place, and means for securing the connecting brackets to the ends of the pin.

6. A wheelbarrow wheel having a tubular spindle with its bore countersunk at its ends forming internal shoulders, rings fitting in the countersunk bores against the internal shoulders, a pin passing through the tubular spindle and the rings, series of rollers fitting in the countersunk ends of the tubular spindle and held in place by the rings, connecting brackets having tapering openings through which the ends of the pin pass and provided with cup-shaped recesses to receive and protect the ends of the tubular spindle and hold the rollers in place, the tapering openings of the connecting brackets permitting variations in the positioning thereof with relation to the pin, and cotter pins connecting the ends of the pin with the connecting brackets.

7. A wheelbarrow wheel having a tubular spindle, a pin passing through the tubular spindle, roller bearings between the pin and the tubular spindle, connecting brackets having openings through which the pin loosely passes, and cotter pins passing through the connecting brackets and the ends of the pin and permitting movement of the pin in the openings of the connecting brackets.

In testimony whereof, we affix our signatures, in presence of two witnesses.

CHARLES A. BAKER.
THOMAS L. SMITH.

Witnesses to Charles A. Baker's signature:
ANNA F. SCHMIDTBAUER,
R. S. C. CALDWELL.

Witnesses to Thomas L. Smith's signature:
MARY BELLE CHASE,
ANNIE A. SMITH.